(12) United States Patent
Newton

(10) Patent No.: US 6,947,095 B2
(45) Date of Patent: Sep. 20, 2005

(54) BROADCAST DATA RECEIVER AND METHOD OF USE THEREOF

(75) Inventor: Mark Newton, Shipley (GB)

(73) Assignee: Pace Micro Technology, Plc., Saltaire (GB)

(*) Notice: Subject to any disclaimer, the term of this patent is extended or adjusted under 35 U.S.C. 154(b) by 716 days.

(21) Appl. No.: 09/960,135

(22) Filed: Sep. 21, 2001

(65) Prior Publication Data

US 2002/0059647 A1 May 16, 2002

(30) Foreign Application Priority Data

Sep. 22, 2000 (GB) .............................................. 0023267
Jan. 26, 2001 (GB) .............................................. 0102041

(51) Int. Cl.[7] .......................... H04N 11/00; H04N 7/00
(52) U.S. Cl. ...................... 348/461; 348/505; 348/549; 348/465
(58) Field of Search ................................ 348/461, 468, 348/465, 473, 505, 549; 386/46, 83, 125, 126; 725/131, 139, 151, 134, 142; H04N 11/00, 7/00

(56) References Cited

U.S. PATENT DOCUMENTS 6,011,899 A * 1/2000 Ohishi et al. .................. 386/98
6,014,349 A * 1/2000 Iwasaki et al. .......... 369/47.28
6,052,152 A * 4/2000 Malcolm et al. ............. 348/537
6,185,364 B1 * 2/2001 Sawada ........................ 386/95
6,380,980 B1 * 4/2002 Huang ......................... 348/505
6,449,231 B1 * 9/2002 Numata ...................... 369/53.2

FOREIGN PATENT DOCUMENTS

EP        0914010 A2    5/1999    ............ H04N/7/62
EP        0998134 A2    5/2000    ............ H04N/5/00

* cited by examiner

*Primary Examiner*—John Miller
*Assistant Examiner*—Trang U. Tran
(74) *Attorney, Agent, or Firm*—Head, Johnson & Kachigian

(57) ABSTRACT

A broadcast data receiver (BDR) is provided and a method of using the BDR for the production of a pseudo stable reference control for the reliable generation of composite video signals. The BDR receives video, audio and/or auxiliary data from a broadcaster can stored a part of all of the data in storage means, typically in the form of a hard disk drive. When the BDR is deriving video data from the hard disk due to the BDR being disconnected from the signal feed from the broadcaster, the BDR uses a pseudo stable reference produced by deriving one or more values from stable frequency information embedded in incoming data. The pseudo stable reference is used to control the frequency of a VCXO in the BDR, thereby allowing accurate color sub-carrier frequency generation for the generation of a final video output. The one or more values can be average stable reference control values extracted from the incoming data or the one or more values can be derived from locking the frequency of the VCXO to an off air incoming data stream.

22 Claims, 2 Drawing Sheets

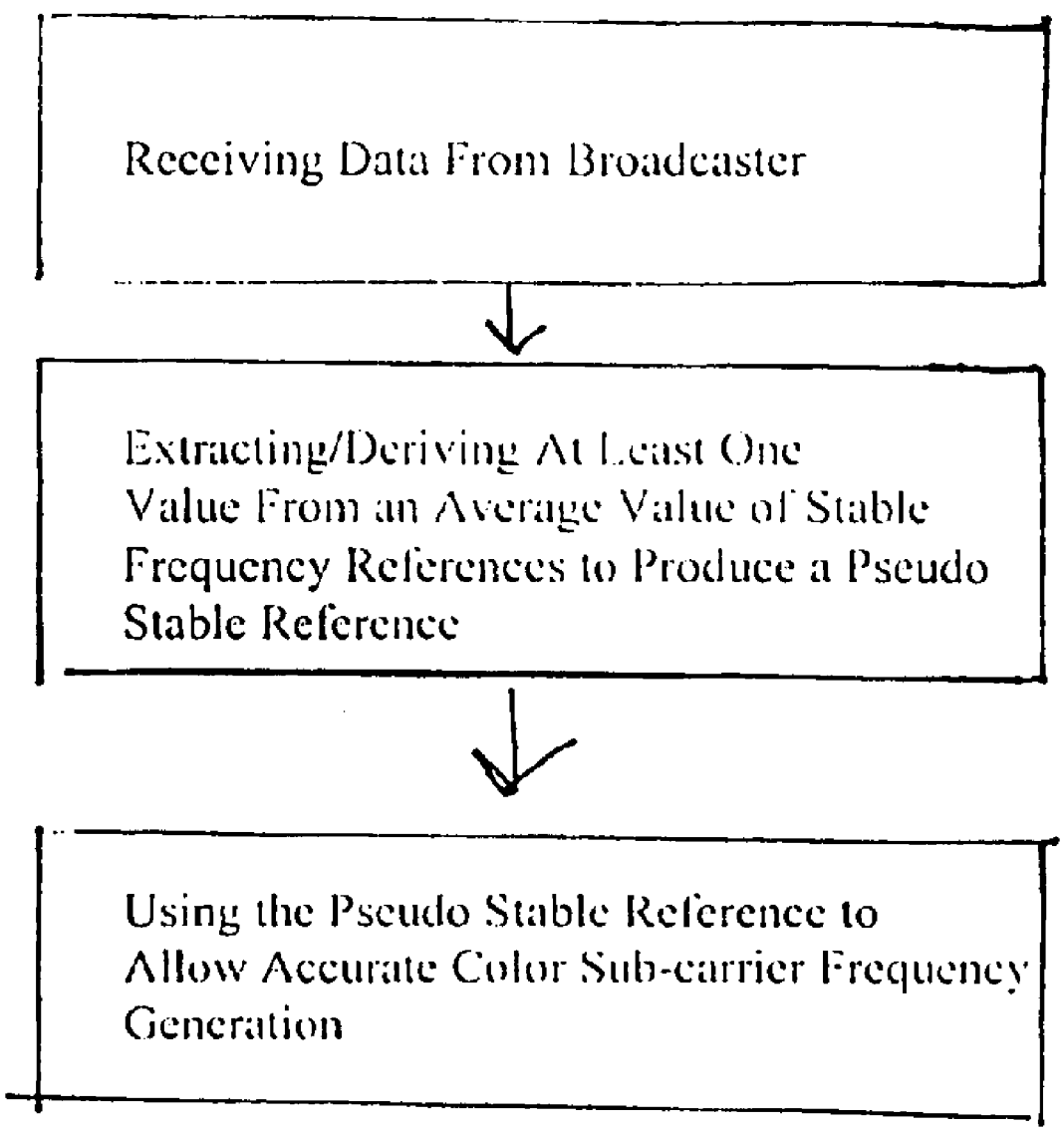

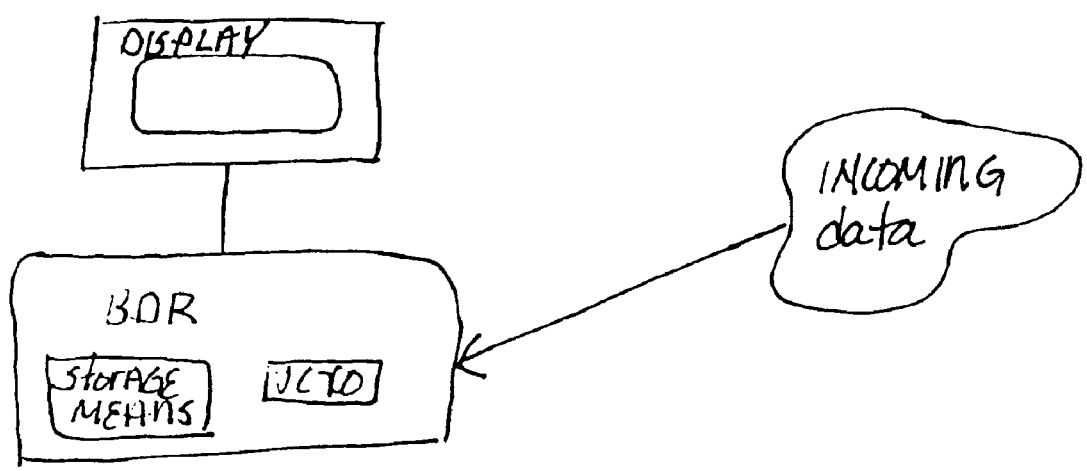
Proposed FIGURE 2

BROADCAST DATA RECEIVER AND METHOD OF USE THEREOF

CROSS-REFERENCE TO-RELATED APPLICATION

This application claims priority to British Patent Application British Patent Application No. 0023267.8 filed 22 Sep. 2000 and British Patent Application No. 0102041.1 filed 26 Jan. 2001.

BACKGROUND OF THE INVENTION

This invention relates to a broadcast data receiver (BDR) and a method of use of said BDR.

The BDR referred to in the following description typically includes a display screen connected to or integrally formed with the BDR. The BDR allows for the generation of audio, visual and auxiliary data from digital data received from a broadcaster. In normal operation, a BDR receiving digital data will derive accurate frequency information from a stable reference embedded in the broadcast data stream.

BDRs typically contain a voltage controlled crystal oscillator (VCXO) generating a local frequency which is usually varied by up to +/−100 ppm about a nominal frequency, typically 27 MHz. Off air Moving Picture Expert Group MPEG transport stream/broadcast data streams have stable reference control signals embedded therein which are common to a 90 KHz system clock reference (SCR). The microprocessor of a BDR produces a suitable pulse width modulated (PWM) waveform based on the SCR value to control the frequency of the VCXO. An accurate VCXO frequency allows accurate color subcarrier frequency generation, thereby allowing the generation of the final video output.

Storage means such as low cost, high capacity hard disk drives are now being used for the recording and playback of audio and video data in BDRs. On occasions when the BDR is disconnected from the signal feed from the broadcaster, video data is read from the hard disk drive. Under these circumstances an accurate SCR is unavailable, as even though the stable reference signal can be recorded on the hard disk drive, upon playback it will have lost its accuracy. This is because it is being replayed under the control of the local VCXO frequency, which is not a stable reference, rather than the SCR frequency it was originally broadcast at.

Phase Alternation Line (PAL PAL decoders in televisions take composite video signals (i.e. video signals containing luminance, color and synchronization pulses which are generated by BDRs) from the video output of BDRs and recover the constituent red, green and blue components for display on the screen of the television or monitor. The PAL decoder in an average television can lock to a color subcarrier frequency generated by the VCXO deviating by up to +/−200 Hz. This equates to +/−45 ppm about the subcarrier frequency of 4.43361975 MHz. If the free run frequency of the 27 MHz VCXO deviates beyond this point, as it can do when an inaccurate Pulse Width Modulated PWM is generated due to the absence of a stable SCR value, it is possible for the PAL decoder to lose color lock. This can result in color loss to the image displayed on the display screen, which is undesirable.

A similar problem is encountered when playing back BDR recordings on a video cassette recorder (VCR), for example if the user is trying to clear hard disk space in the BDR by transferring data onto a VCR. VCR's are less tolerant to errors in color carrier frequency than television systems and can introduce further errors to the recorded SCR. As such, when the recording has been transferred from the BDR to the VCR and the VCR is then played back on the display screen of the television system, the error in the color sub-carrier frequency results in deviations in PWM greater than the PAL decoder of the television can lock onto. This results in color loss of the image displayed on the display screen.

The aim of the present invention is to provide a method for the production of a pseudo stable reference control for the reliable generation of composite video signals replayed from storage means using a BDR.

SUMMARY OF THE INVENTION

According to a first aspect of the present invention there is provided a method for the production of a pseudo stable reference control for the reliable generation of composite video signals from a broadcast data receiver (BDR), said BDR receiving video, audio and/or auxiliary data from a broadcaster, said BDR having storage means in which to store data and characterized in that said method includes the steps of said BDR producing a pseudo stable reference by extracting/deriving one or more values from frequency information embedded in incoming broadcast data and using said pseudo stable reference to control the frequency of a VCXO in the BDR, thereby allowing accurate color subcarrier frequency generation for the generation of a video output via the BDR, or a VCR communicating with said BDR.

In one embodiment the one or more values are average values of stable frequency information/references embedded in incoming digital and/or analogue data.

Preferably the pseudo stable reference is stored in the storage means and updated over pre-determined time intervals.

Preferably the storage means is in the form of a hard disk drive.

Preferably the BDR includes micro-processing means which can extract data embedded in broadcast data streams and produce a suitable PWM signal. The PWM is then used to control the local frequency of the VCXO.

Preferably an algorithm is employed within the BDR software, to monitor and record the PWM signal(s).

Preferably the values used for the pseudo stable reference are average PWM readings recorded during the phase locked loop of software routine of the microprocessor.

The phase locked loop software compares the 90 KHz stable frequency reference of SCR from the data stream to the local frequency value of the VCXO. The software operates to minimize the difference between the exact count of 90 KHz stable clock cycles and the clock cycle count of the BDR local crystal oscillator, and preferably these should be the same. If there is any difference then the software either increases or decreases the VCXO frequency until the local 90 KHz counts match those of the incoming data stream.

Preferably the one or more average PWM values include the mean or median average readings.

In one embodiment the pseudo stable reference is the average of the current PWM value, the most recent PWM value stored in the BDR/microprocessor and the oldest PWM value stored in the BDR/microprocessor. The values can be stored in memory in the BDR with the memory being of any suitable non-volatile form such as the Hard Disk Drive memory or Electrically Erasable Programmable Read-Only Memory (EEPROM) memory as both of these types will maintain the data in memory if the power supply is removed.

Preferably a timer is provided in the BDR to allow a predetermined time period to pass before the microprocessor records a PWM value. This time period allows for temperature equilibrium of the BDR In one embodiment the one or more values are derived by locking the frequency of the VCXO in the BDR to an off air data stream and using the frequency information embedded in the off air data stream as the pseudo stable reference to control the frequency of the VCXO. The locking can be performed by using conventional phase locked loop algorithms and this, in turn, allows the generation of the pseudo stable reference when there is no live off-air signal.

Preferably if there is a choice of digital or analogue broadcast signals from which the one or more values can be derived therefrom, the BDR derives the one or more values from an analogue data signal.

Preferably locking of the frequency of the VCXO within the BDR to an off air data stream is undertaken during or at the same time as playback of data stored in the BDR and/or VCR.

Preferably the BDR records and stores one or more extracted stable frequency reference values from the off air data stream at pre-determined time intervals, so that if locking of the BDR to the off air data stream is lost during playback of stored data from the BDR and/or VCR, the BDR uses the last recorded stable frequency reference value to continue playback of the stored data. Once locking of the BDR to the off air data stream is resumed, the last recorded stable frequency reference value is discarded and the stable frequency value taken from the off air data stream is used.

If the BDR is provided with means to watch and record different television channels simultaneously and when the BDR is recording data from one or more channels, the BDR switches the front end of the record channel(s) off, extracts the stable reference value(s) from the data stream of the channel being watched and uses the stable reference value to lock the watch and record channels together. If one of the watch and record channels is an analogue channel, and the stable frequency value from this channel is used to lock the watch and record channels together.

Preferably the record channel(s) include(s) any or any combination of a channel from which data is being recorded onto a VCR or BDR, a channel being used to play back video data from the BDR, or a recording mode in which digital data is being copied from the BDR onto a VCR.

According to a second aspect of the present invention there is provided a broadcast data receiver, said BDR receiving video, audio and/or auxiliary data from a broadcaster, said BDR having storage means in which to store data and characterised in that the BDR is provided with means for producing a pseudo stable reference by deriving/extracting one or more values from frequency information embedded in incoming data, and said pseudo stable reference is used to control the frequency of a VCXO in the BDR, thereby allowing the generation of an accurate sub-color frequency for the playback of stored data from the BDR and/or a VCR.

The pseudo stable reference is typically used when the BDR and/or VCR is deriving video data from said storage means.

In one embodiment the one or more values are average values of stable frequency information embedded in incoming data.

In an alternative embodiment the one or more values are provided by locking the reference from the VCXO within the BDR to an off air data stream, and one or more stable reference values embedded in said off air data stream are used to generate a pseudo stable reference control.

The present invention therefore allows hard disk drive video playback to be performed with conventional television receivers to produce a composite video image that can be displayed or archived onto videocassette/hard disk drive under typical domestic operating conditions. The pseudo stable reference is used as there is no accurate frequency information embedded in incoming digital data.

An advantage of the present invention is that it avoids the need for an expensive high stability free running oscillator to be used in the BDR. In addition, the effect of using a pseudo stable reference to drive/control the VCXO, which is updated at regular intervals, is to self compensate against the effects of crystal ageing (which results in frequency drift).

A further advantage of the present invention is that any seasonal changes in temperature in the operating environment of the BDR are automatically compensated for. The method is cheap and no additional hardware is required other than a standard BDR.

BRIEF DESCRIPTION OF THE DRAWINGS

FIG. 1 is a flow chart setting forth the steps of the present invention.

FIG. 2 is a diagrammatic view of the present invention.

DESCRIPTION OF THE PREFERRED EMBODIMENTS

Embodiments of the present invention will now be described with reference to the following description:

In one embodiment of the present invention in normal operation, the microprocessor of the BDR records the SCR (stable clock reference) embedded in incoming data streams during the phase locked loop software routine and produces a suitable PWM to control the frequency of the VCXO. The PWM readings are recorded in the non-volatile memory of the BDR at regular intervals, and can then be used subsequently as a pseudo stable reference when retrieving transport stream data from the hard disk drive.

The PWM reading stored in the non-volatile memory is typically a representative value of the BDR in temperature equilibrium. A timer can be activated in the BDR to allow a sufficient 'warm up' time to pass before the PWM reading is recorded and stored. This warm up time may be necessary if, for example, the BDR has been left in a standby condition for an extended period of time.

The 'warm up' time can be determined by monitoring the time contained within the digital video broadcast (DVB) service information (SI), or from an embedded real time clock. It is not necessary to store both the time and the PWM reading in the non-volatile memory of the BDR.

The pseudo stable reference can be based on the means or median average of PWM values taken over a pre-determined period of time. It will be understood by persons skilled in that art that a number of different methods of calculating average readings be used to drive the VCXO at a suitable frequency.

For example, the PWM reading can be recorded after approximately 30 minutes of the BDR being activated from a standby condition. This reading will be referred to as the current reading [PWM current].

In the non-volatile memory of the BDR, two previous PWM readings are stored; [PWM recent] and [PWM oldest].

The average of the three PWM readings are taken to produce the pseudo stable reference:

[PWM current]+[PWM recent]+[PWM oldest]

The pseudo stable reference is then used as the VCXO drive value when playing back data from the hard disk of the BDR. An accurate VCXO value allows the PAL decoder to lock onto the color subcarrier frequency and prevents color loss of the image displayed on the display screen.

This calculated reference value can then become the new PWM[recent] and is stored in the memory. The old PWM [recent] becomes the PWM[oldest] and is stored in the memory and the old PWM[oldest] reading is deleted from the memory.

The above process can be repeated over pre-determined time intervals. If the BDR is in a standby condition for more than 24 hours, the BDR can be moved from the standby condition to an "on condition" and allowed to reach temperature equilibrium before the PWM reading is taken, typically using the timer.

Non-volatile memory employing EEPROM technology can be used and this typically allows approximately 10,000 reliable read/write cycles to be undertaken. This equates to 27 years of operation of the memory if the PWM value is updated once every 24 hours and shows that the working life of the BDR is not compromised by the introduction of the present invention.

It can be seen from the above description that the method of the present invention reduces the effect of any non-representative high or low PWM values that may have previously been sampled and allows the VCXO to be driven at a frequency similar to the SCR value of the originally broadcast data.

In an alternative embodiment of the present invention in normal operation, when the BDR is required to playback digital data stored on its hard disk drive, either directly onto a television screen or indirectly via copying the digital data onto a VCR storage means, the BDR locks onto an off air data stream and derives a pseudo stable reference control value therefrom. This reference is based on the stable clock reference (SCR) embedded in the data stream. The extraction of SCR data is typically performed by the microprocessor in the BDR and the remaining data of the data stream is discounted. The microprocessor uses the derived SCR value to produce a suitable pulse width modulated (PWM) waveform to control the voltage controlled crystal oscillator (VCXO) of the BDR. The color subcarrier frequency generated by the VCXO is then locked onto by the PAL decoder of the television to prevent color loss of the image displayed on the television display screen.

In a similar manner, when digital data is being transferred from the BDR to a video cassette recorder (VCR), the BDR locks onto an off air data stream and derives a pseudo stable reference control based on the stable reference embedded in the off air data stream. The pseudo stable reference control value is then used to set the VCXO of the BDR to ensure that the digital data being copied onto the VCR has an accurate SCR value. This is particularly important as VCR's are less tolerant to errors in color carrier frequency than television systems, and can introduce further errors to the VCR recorded SCR. Thus the pseudo stable reference prevents color loss of images displayed on the television display screen from VCR data, which in turn has been recorded from BDR data.

The BDR records SCR values from off air data streams at predetermined time intervals and stores these values in storage means of the BDR. In the event that during playback of stored digital data from the BDR, locking of the BDR to the off air data stream is lost, the BDR uses the last recorded SCR to continue playback of stored digital data without any loss of color of the vide output. Once locking of the BDR onto an off air data stream is restored, the BDR reverts to deriving pseudo stable reference values from the SCR embedded in the off air data stream.

In the event that the BDR is provided with multi-tuners (i.e., has the ability to allow a channel to be watched whilst recording a different channel) at least two SCR values will typically be present in the BDR. This may result in an error in setting the VCXO to the correct frequency for either, or both, of the channels being recorded and watched. In order to prevent this error, the present invention provides means for switching the timing control SCR values of the record channel off. A pseudo stable reference is then derived from the SCR embedded in the off air data stream of the channel being watched. This pseudo stable reference value is then used by the record channel to lock the watch and record channels together.

The recorded channel can include a channel from which data is being recorded onto a VCR or a BDR, a channel being used to play back video data from the BDR or a recording mode in which digital data is copied from the BDR onto the VCR.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method for the production of a pseudo stable reference control for the reliable generation of composite video signals from a broadcast data receiver receiving video, audio and/or auxiliary data from a broadcaster, said broadcast data receiver having storage means in which to store data, said method includes the steps of:

said broadcast data receiver producing a pseudo stable reference by extracting/deriving at least one value from an average value of stable frequency references embedded in incoming data: and using said pseudo stable reference to control the frequency of a voltage controlled crystal oscillator in said broadcast data receiver, thereby allowing accurate color sub-carrier frequency generation for the generation of a video output via said broadcast data receiver, or a videocassette recorder communicating with said broadcast data receiver.

2. A method according to claim 1 wherein said derived pseudo stable reference is stored in said storage means and updated at pre-determined time intervals.

3. A method accordinig to claim 1 wherein said storage means is in the form of a hard disk drive.

4. A method according to claim 1 wherein said broadcast data receiver is provided with micro-processing means which may extract the frequency references embedded in the incoming data streams and produce a suitable pulse width modulated signal to control the frequency of said voltage controlled crystal oscillator.

5. A method according to claim 1 wherein said at least one value is average pulse width modulated readings.

6. A method according to claim 5 wherein said average pulse width modulated readings are extracted/recorded during the phase locked loop of software routine of the microprocessing means.

7. A method accoring claim 6 wherein the phase locked loop software compares a 90 KHz stable clock reference from the incoming data stream to the local frequency of said voltage control led crystal oscillator.

8. A method according to claim 1 wherein said average stable frequency reference values include the mean or median average readings thereof.

9. A method according to claim 5 wherein said pseudo stable reference is the average of the current pulse width modulated value, the most recent pulse width modulated value stored in memory in said broadcast data receiver and the oldest pulse width modulated value stored in memory in said broadcast data receiver.

10. A method according to claim 1 wherein timer means are provided in said broadcast data receiver to allow a pre-determined time period to pass before the microprocessing means extracts/records said at least one value from said incoming data stream.

11. A method according to claim 10 wherein said timer means is a real time clock embedded in the incoming data.

12. A method according to claim 10 wherein said timer means is information derived from digital video broadcast service information.

13. A method for the production of a pseudo stable reference control for the reliable generation of composite video signals from a broadcast data receiver receiving video, audio and/or auxiliary data from a broadcaster, said broadcast data receiver having storage means in which to store data, said method includes the steps of:

said broadcast data receiver producing a pseudo stable reference by exracting/deriving at least one value from an average pulse width modulated, the at least one value being derived by locking the frequency of said voltage controlled crystal oscillator in said broadcast data receiver to an off air data stream and using the freuency information embedded in said off air data stream as the pseudo stable reference to control the frequency of the voltage controlled crystal oscillator, thereby allowing accurate color sub-carrier frequency generation for the generation of a video output via said broadcast data receiver or a videocassette recorder communicating with said broadcast data receiver; and the broadcast data receiver providing means for watching and recording different television channels simultaneously and when the broadcast data receiver is recording data from at least one channel, the broadcast data receiver switches the front end of the record channel off, extracts the stable reference value from the data stream of the channel being watched and uses the stable reference value to lock the watch and record channels together.

14. A method according to claim 13 wherein if there is a choice of digital or analogue broadcast signals from which said at least one value may be derived therefrom, said broadcast data receiver derives said at least one value from an analogue data signal.

15. A method according to claim 13 wherein locking of the frequency of said voltage controlled crystal oscillator within said broadcast data receiver to an off air data stream is undertaken during or at the same time as playback of data stored in said broadcast data receiver and/or videocassette recorder.

16. A method according to claim 13 wherein said broadcast data receiver records and stores at least one extracted stable frequency reference value from the off air data stream at pre-determined time intervals, so that if locking of said broadcast data receiver to the off air data stream is lost during playback of stored data from said broadcast data receiver and/or videocassette recorder, said broadcast data receiver uses the last recorded stable frequency reference value to continue playback of the stored data.

17. A method according to claim 16 wherein once locking of said broadcast data receiver to the off air data stream is resumed, the last recorded stable frequency reference value is discarded and the stable frequency value taken from the off air data stream is used.

18. A method according to claim 13 wherein one of the watch and the record channels is an analogue channel, and the stable frequency value from this channel is used to lock the watch and record channels together.

19. A method according to claim 13 wherein said record channel(s) include at least one from the group consistinig of a channel from which data is bcintt recorded onto a videocassette recorder or broadcast data receiver, a channel being used to play back video data from said broadcast data receiver, or a recording mode in which digital data is being copied from said broadcast data receiver onto a videocassette recorder.

20. A broadcast data receiver, said broadcast data receiver comprising: means for receiving video, audio and/or auxiliary data from a broadcaster; storage means in which to store data; means for producing a pseudo stable reference by deriving/extracting at least one value from an average value of stable frequency references embedded in incoming data; and said pseudo stable reference being used to control the frequency of a voltage controlled crystal oscillator in the broadcast data receiver, thereby allowing the generation of an accurate sub-color frequency for the playback of stored data from said broadcast data receiver and/or a videocassette recorder.

21. A broadcast data receiver according to claim 20 wherein said pseudo stable reference is used when at least one of said broadcast data receiver and videocassette recorder is deriving video data from said storage means.

22. A broadcast data receiver according to claim 20 wherein said at least one value is provided by locking the reference from said voltage controlled crystal oscillator within said broadcast data receiver to an off air data stream, and at least one stable reference value embedded in said off air data stream is used to generate a pseudo stable reference control.

* * * * *